United States Patent
Kao (10) Patent No.: US 6,444,913 B1
(45) Date of Patent: Sep. 3, 2002

(54) TERMINAL CONNECTOR STRETCHER FOR HIGH-TENSION CABLE

(76) Inventor: Sui Chan Kao, No. 59, Lane 19, Hsin Sheng North Road, Section 3, Taipei City (TW)

( * ) Notice: Subject to any disclaimer, the term of this patent is extended or adjusted under 35 U.S.C. 154(b) by 0 days.

(21) Appl. No.: 09/975,971

(22) Filed: Oct. 15, 2001

(51) Int. Cl.$^7$ .................................................. B23P 19/02
(52) U.S. Cl. ........................................ 174/73.1; 29/235
(58) Field of Search ........................... 174/73.1, 152 G, 174/154, 157, 167, 168, 138 R, 138 E, 138 G; 254/133 R, 134.3 R; 29/33 K, 235, 745, 825

(56) References Cited

U.S. PATENT DOCUMENTS

| | | | | |
|---|---|---|---|---|
| 3,808,352 A | * | 4/1974 | Johnson | 174/135 |
| 4,389,440 A | * | 6/1983 | Keith | 174/135 |
| 4,871,599 A | * | 10/1989 | Knorr | 138/113 |
| 5,087,492 A | * | 2/1992 | Vallauri et al. | 174/73.1 |
| 5,130,495 A | * | 7/1992 | Thompson | 174/142 |
| 5,408,047 A | * | 4/1995 | Wentzel | 156/49 |
| 5,468,911 A | * | 11/1995 | Leve et al. | 174/35 C |
| 5,495,650 A | * | 3/1996 | Crepel et al. | 29/235 |
| 5,685,052 A | * | 11/1997 | Meyers et al. | 29/235 |
| 5,944,929 A | * | 8/1999 | Vallauri et al. | 156/162 |
| 6,049,960 A | * | 4/2000 | Pilling et al. | 29/235 |

* cited by examiner

*Primary Examiner*—Dean A. Reichard
*Assistant Examiner*—Adolfo Nino
(74) *Attorney, Agent, or Firm*—Rosenberg, Klein & Lee (57) ABSTRACT

A cable terminal connector stretcher includes a pawl ring, the pawl ring having plurality of equiangularly spaced and longitudinally extended pawls, and locking loop adapted to be fastened to the pawls of the pawl ring to secure the pawl ring to a high-tension cable terminal connector.

2 Claims, 9 Drawing Sheets

TERMINAL CONNECTOR STRETCHER FOR HIGH-TENSION CABLE

BACKGROUND OF THE INVENTION

The present invention relates to high-tension cable terminal connectors and, more specifically, to a cable terminal connector stretcher for high-tension cable, which enables the cable terminal connector to be quickly installed with less labor consumption.

Figure 1A:
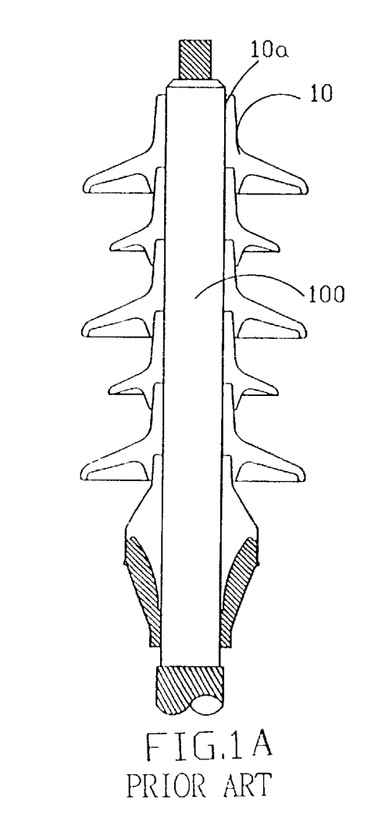
FIG. 1A shows the installation of a pre-mold cable terminal connector according to the prior art.
Figure 1B:
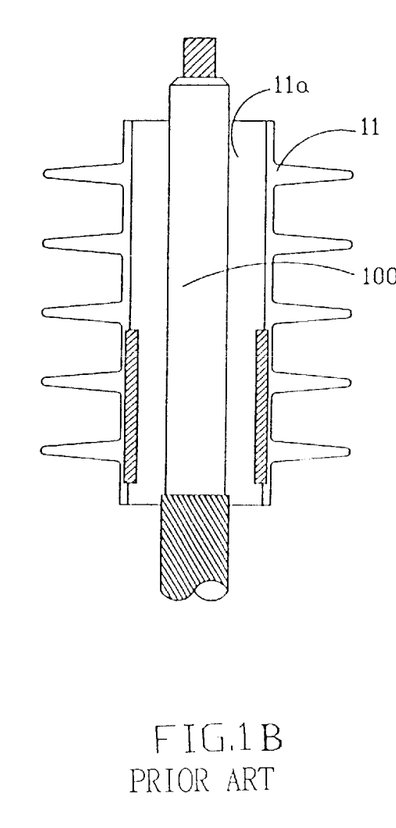
FIG. 1B shows the installation of a heat-shrink type cable terminal connector according to the prior art.
Figure 1C:
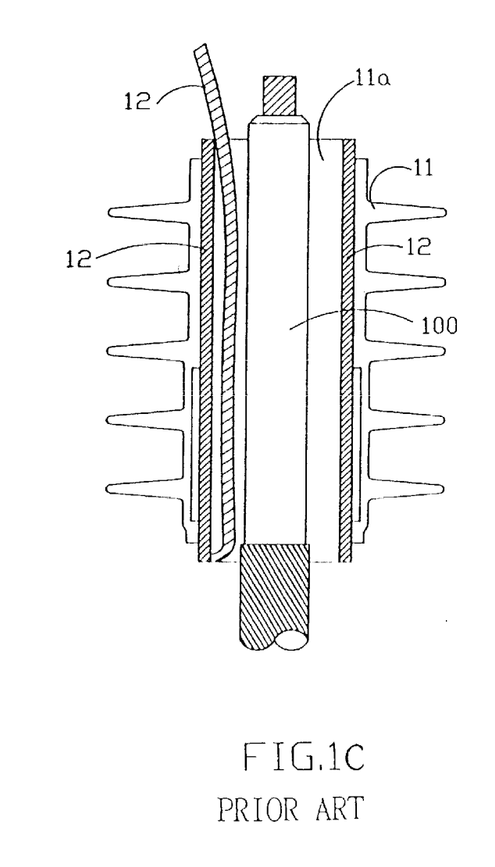
FIG. 1C shows the installation of a cold-shrink type cable terminal connector according to the prior art.
Figure 2:
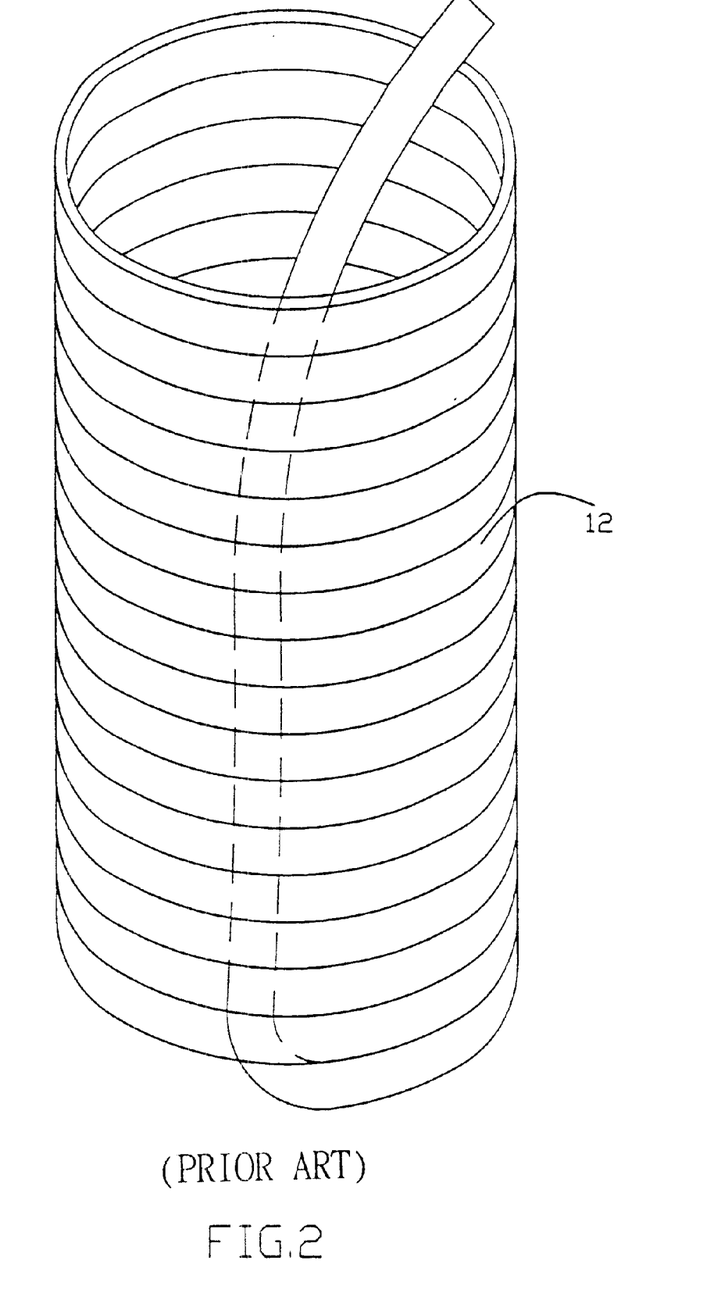
FIG. 2 shows a spiral tube of the prior art.

Conventional high-tension cable terminal connectors include pre-mold/pre-fabricated type, heat-shrink type, and cold-shrink type. A pre-mold/pre-fabricated type cable terminal connector, as shown in FIG. 1A, is comprised of a plurality of electrically insulative disk nuts 10 fastened to on e another in series. The disk nuts 10 have a center r through hole 10a fitting the outer diameter of the cable 100. During installation, silicon lubricating grease is applied to the periphery of the cable 100, and then the cable is forced into the center through hole 10a of each disk nut 10. Because the disk nuts 10 are injection-molded from plastics, it is difficult to control the shrinkage of the center through hole 10a, and rainwater tends to leak in the gap between the cable 100 and the disk nuts 10, causing a short-circuit. A heatshrink type cable terminal connector 11 as shown in FIG. 1B, has a center through hole 11a of diameter greater than the outer diameter of the cable 100. After insertion of the cable 100 through the center through hole 11a of the heat-shrink cable terminal connector 11, a torch is operated to bake the cable terminal connector 11, causing it to shrink. However, the heatshrink cable terminal connector 11 tends to be burned out accidentally when baking. When a cold-shrink cable terminal connector 11 is used, as shown in FIG. 1C, a tool (not shown) is inserted t through the center through hole 11a of the cold-shrink cable terminal connector 11 and operated to expand the outer diameter of the cold-shrink cable terminal connector 11, and then a spiral tube 12 (see FIG. 2) is inserted into the tool in the center through hole 11a of the cold-shrink cable terminal connector 11, and then the tool is removed from the coldshrink cable terminal connector 11, and then the cable 100 is inserted through the spiral tube 12 in the center through hole 11a of the cold-shrink cable terminal connector 11 after having been coated with a layer of silicon lubricating grease, and then the spiral tube 12 is pulled out of the cold-shrink cable terminal connector 11. After removal of the spiral tube 12 from the cold-shrink cable terminal connector 11, the cold-shrink cable terminal connector 11 shrinks to hold down the cable 100. This method is functional, however the use of the spiral tube 12 greatly increases the installation cost.

SUMMARY OF THE INVENTION

It is the main object of the present invention to provide a cable terminal connector stretcher for high-tension cable, which saves much cable terminal connector installation cost and labor. According to the present invention, the cable terminal connector stretcher comprises a pawl ring, the pawl ring comprising plurality of equiangularly spaced and longitudinally extended pawls, and locking loop adapted to be fastened to the pawls of the pawl ring to secure the pawl ring to a high-tension cable terminal connector. According to another aspect of the present invention, the locking loop is comprised of a strip of resilient material having two ends fastened together by a snap.

DETAILED DESCRIPTION OF THE PREFERRED EMBODIMENT

Figure 3A:
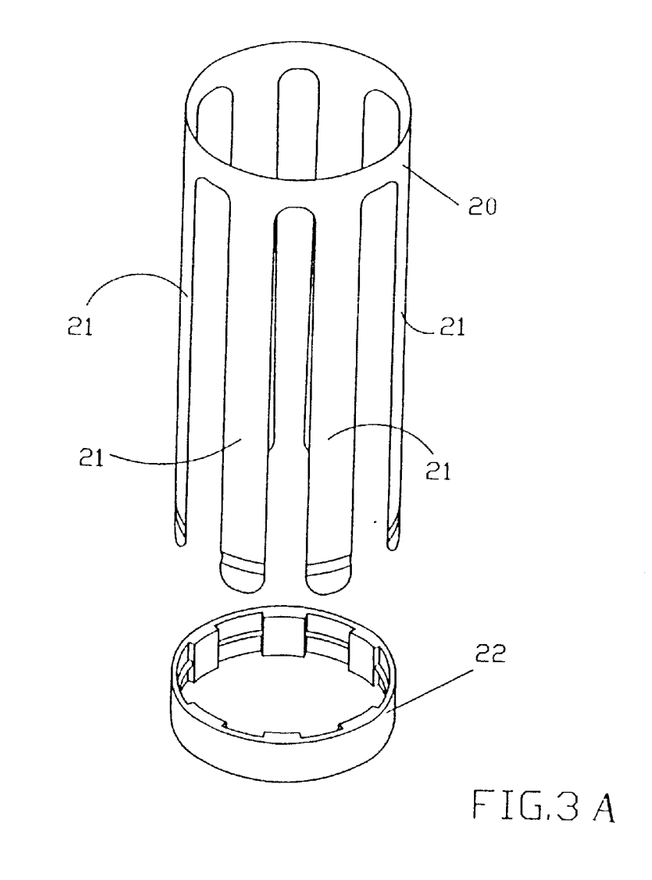
FIG. 3A is an exploded view of a cable terminal connector stretcher according to the present invention.
Figure 3B:
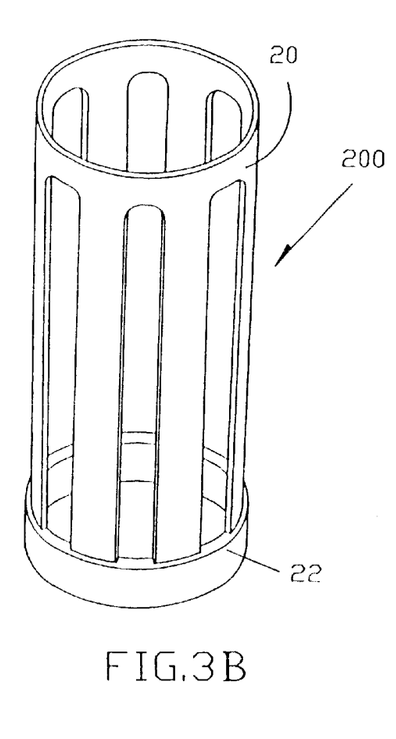
FIG. 3B is an assembled view of a cable terminal connector stretcher according to the present invention.

Referring to FIGS. 3A and 3B, a cable terminal connector stretcher 200 is shown comprised of a pawl ring 20, and a locking loop 22. the pawl ring 20 comprises a plurality of equiangularly spaced and longitudinally extended pawls 21. The locking loop 22 is to be fastened to the pawls 21 to secure the pawl ring 20 to a high-tension cable terminal connector.

Figure 4:
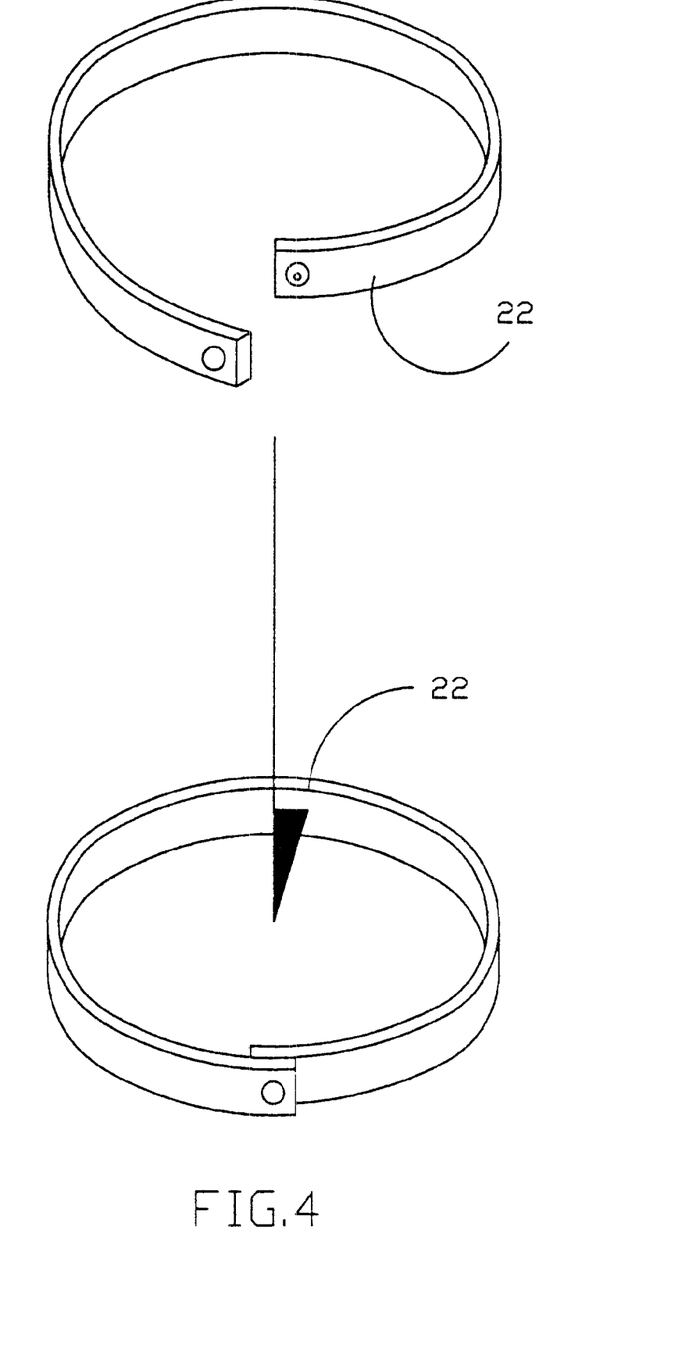
FIG. 4 illustrates the assembly process of the locking loop for the cable terminal connector stretcher according to he present invention.

Referring to FIG. 4, the locking loop 22 is formed of a strip of resilient material that has its ends fastened together by, for example, a snap joint.

Figure 5A:
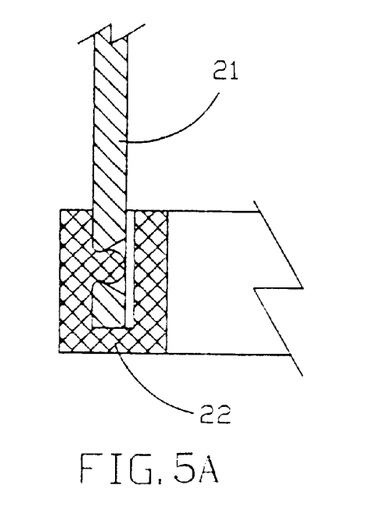
FIG. 5A, FIG. 5B, and FIG. 5C show different pawl ring and locking loop fastening arrangements according to the present invention.
Figure 5B:
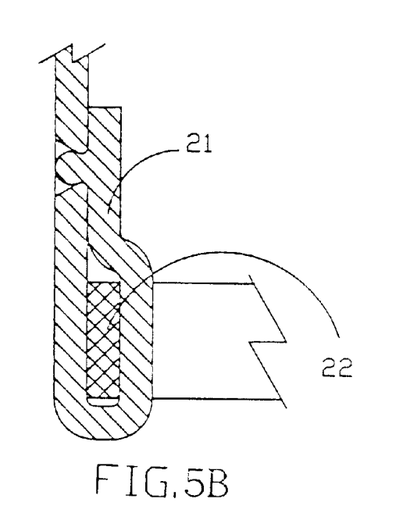
Figure 5C:
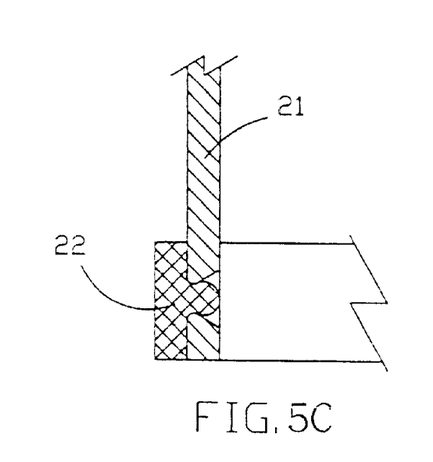

Referring to FIGS. 5A, 5B and 5C, the locking loop 22 can be fastened to the pawls 21 of the pawl ring 20 by any of a variety of known joints or coupling structures.

Figure 6:
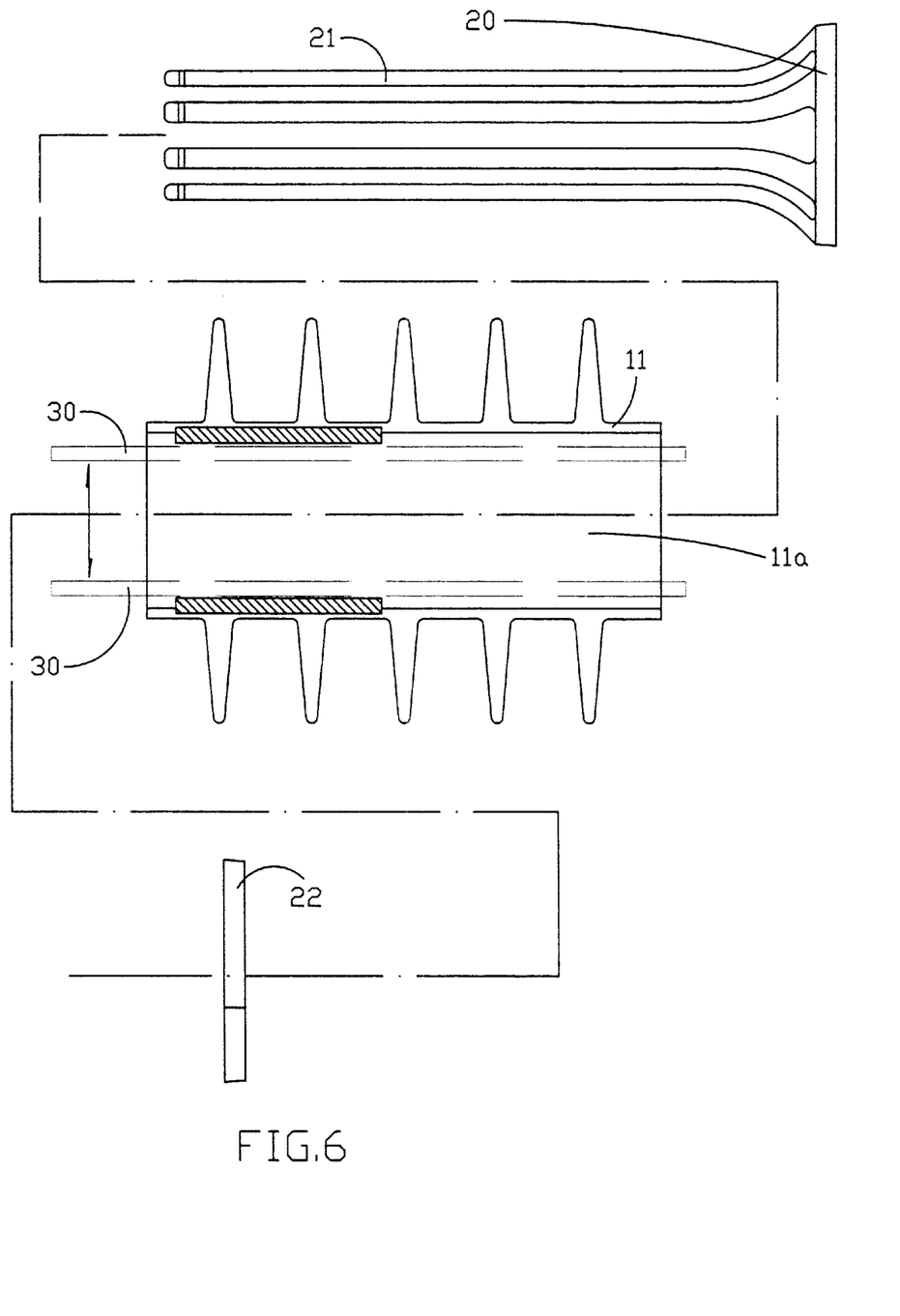
FIG. 6 shows the application of the present invention (Step I).
Figure 7:
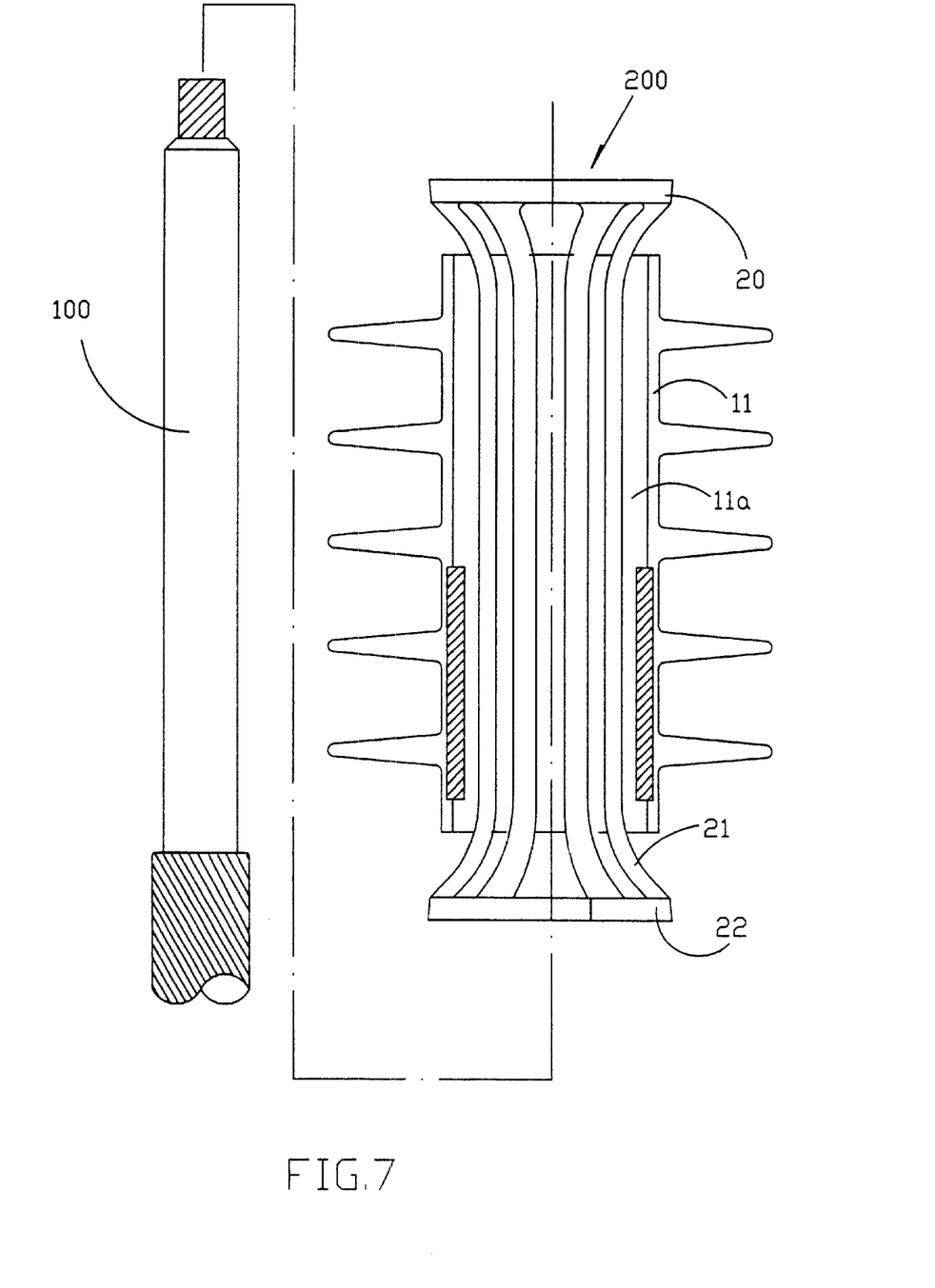
FIG. 7 shows the application of the present invention (Step II).
Figure 8:
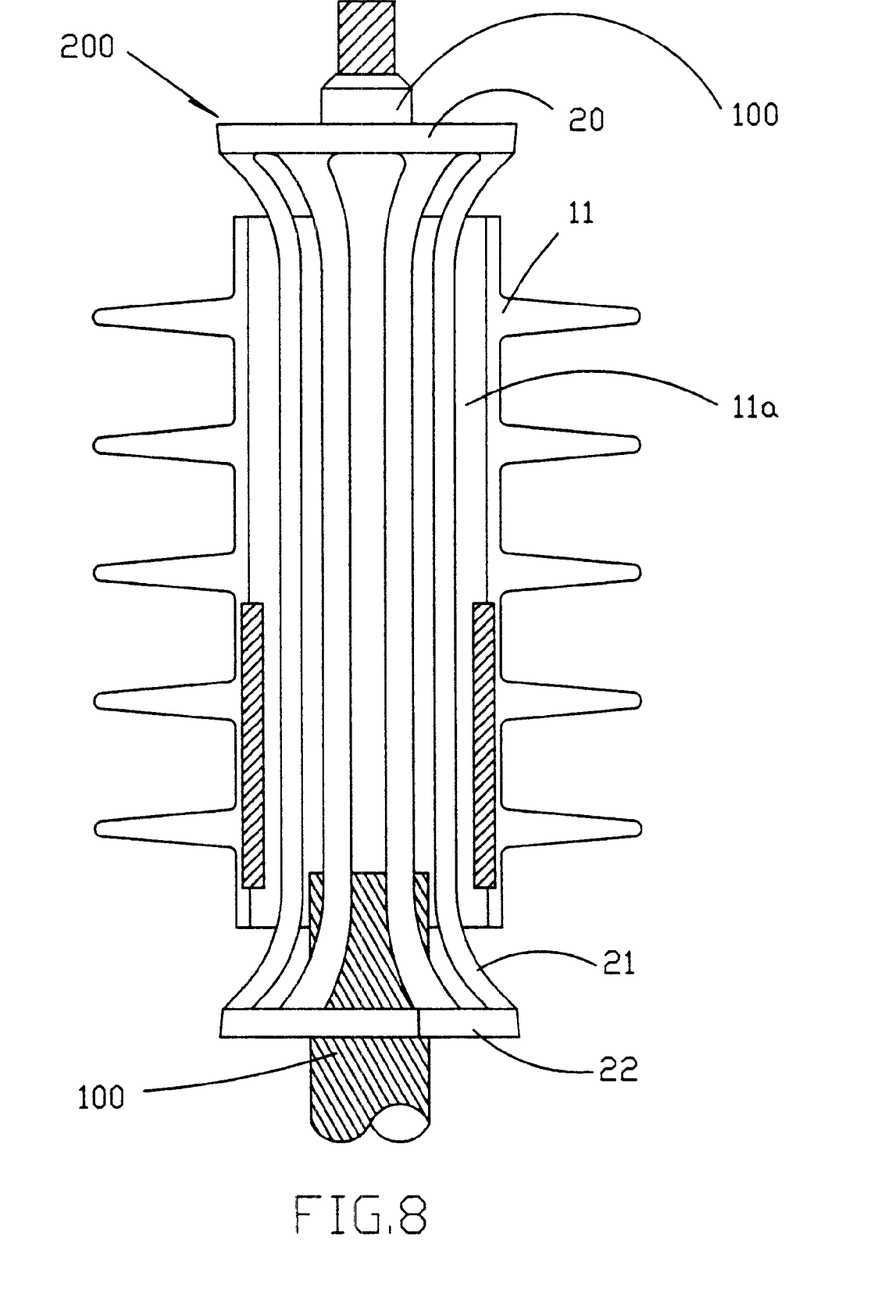
FIG. 8 shows the application of the present invention (Step III).
Figure 9:
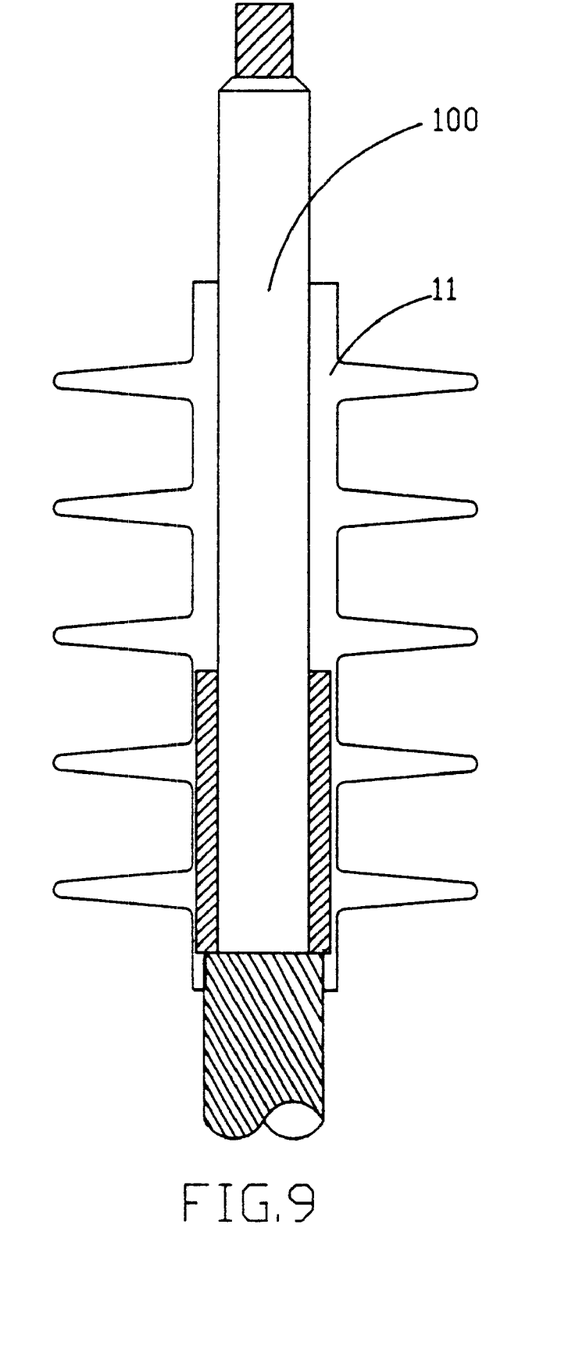
FIG. 9 shows the application of the present invention (Step IV).

Referring to FIGS. From 6 through 9, a tool 30 is used and inserted into the high-tension cable terminal connector 11 to expand the longitudinal through hole 11a of the high-tension cable terminal connector 11 (see FIG. 6), and then the pawls 21 of the pawl ring 20 are radially inwardly compressed and then inserted through the tool 30 in the longitudinal through hole 11a of the high-tension cable terminal connector 11 and the locking loop 22 is fastened to the pawls 21 of the pawl ring 20 to stop the pawl ring 20 from escaping out of the high-tension cable terminal connector 11 and then the tool 30 is removed from the high-tension cable terminal connector 11 (see FIG. 7), and then the high-tension cable 100 is peripherally coated with a layer of silicon lubricating grease and then inserted through the terminal connector stretcher 200 (see FIG. 8), and then the locking loop 22 is unfastened from the pawl ring 20 and the pawl ring 20 is then removed from the high-tension cable terminal connector 11, enabling the high-tension cable terminal connector 11 to be secured to the periphery of the high-tension cable 100.

What the invention claimed is:

1. A cable terminal connector stretcher comprising a pawl ring, said pawl ring comprising a plurality of equiangularly spaced and longitudinally extended pawls, and a locking loop fastenable to said pawls of said pawl ring to secure said pawl ring to a high tension cable terminal connector.

2. The cable terminal connector stretcher of claim 1 wherein said locking loop is comprised of a strip of resilient material having two ends fastened together by a snap.

* * * * *